United States Patent
Otera et al.

[11] Patent Number: 6,114,496
[45] Date of Patent: Sep. 5, 2000

[54] BIODEGRADABLE RESIN COMPOSITION AND PREPARATION PROCESS THEREOF

[75] Inventors: Junzo Otera, Okayama; Toru Yano; Nobuyuki Sakuda, both of Hiroshima, all of Japan

[73] Assignee: Nishikawa Rubber Co., Ltd., Hiroshima, Japan

[21] Appl. No.: 09/369,423

[22] Filed: Aug. 6, 1999

[30] Foreign Application Priority Data

Aug. 7, 1998 [JP] Japan .................. 10-224608

[51] Int. Cl.⁷ .................. C08G 63/06; C08J 3/16
[52] U.S. Cl. .................. 528/361; 528/354; 528/355; 528/357; 524/784
[58] Field of Search .................. 528/361, 354, 528/355, 357; 524/784

[56] References Cited

U.S. PATENT DOCUMENTS

| | | | |
|---|---|---|---|
| 5,053,522 | 10/1991 | Muller | 549/274 |
| 5,142,023 | 8/1992 | Gruber et al. | 528/354 |
| 5,981,694 | 11/1999 | Gruber et al. | 528/354 |

FOREIGN PATENT DOCUMENTS

| | | |
|---|---|---|
| 6-172502 | 6/1994 | Japan . |
| 11-60716 | 3/1999 | Japan . |

*Primary Examiner*—Samuel A. Acquah
*Attorney, Agent, or Firm*—Sughrue, Mion, Zinn, Macpeak & Seas, PLLC

[57] ABSTRACT

A process for preparing a biodegradable resin composition, comprising: providing a reaction mixture comprising at least one hydroxycarboxylic acid and, as a polymerization catalyst, a monoorganotin derivative; heating and stirring the reaction mixture, wherein the heating and stirring step is carried out under a reduced pressure to cause condensation polymerization or carried out in an organic solvent to cause azeotropic dehydrating polymerization. Also disclosed in a biodegradable resin composition prepared by the process.

12 Claims, No Drawings

BIODEGRADABLE RESIN COMPOSITION AND PREPARATION PROCESS THEREOF

FIELD OF THE INVENTION

This invention relates to a biodegradable resin composition which has good moldability or formability and is readily degraded by microorganisms, and relates to a preparation process thereof. More specifically, the present invention relates to a polyhydroxycarboxylic acid resin prepared in the presence of a catalyst which can increase the molecular weight of the resin and has low toxicity, and to a preparation process thereof.

BACKGROUND OF THE INVENTION

Various plastic products making use of the characteristics of plastics such as light weight, low price, excellent processability, and good resistance to corrosion and degradation have so far been put on the market. Owing to their convenience, plastic products have come to be found anywhere not only in our daily life but also in various industrial scenes.

Such a tendency is however accompanied with a yearly increase in the disposal amount of plastic products after use. Since they are resistant to corrosion or degradation, the disposal has come to be a serious problem of environmental pollution.

With the forgoing view, various biodegradable plastics easily degraded into water and carbon dioxide by organisms existing in the nature, particularly, by microorganisms in the soil or water have been developed as a substitute for the corrosion- or degradation-resistant plastic products as described above, and they are now attracting attentions as environmental protecting products.

Examples of such biodegradable plastics include resins produced by microorganisms, natural polymers and synthetic polymers.

Examples of the resins produced by microorganisms include hydroxybutylate polyesters produced by certain hydrogen bacteria.

Examples of the biodegradable natural polymers include natural polymers derived from plants (cellulose, starch and the like) and those derived from animals (chitin contained in the shell of shrimps or crabs)

In addition, polymers synthesized using the above-described natural molecules as a raw material, synthetic high-molecular weight polycaprolactone and pullulan each of which originally has biodegradability, and polymer alloys with a general-purpose plastic (non-biodegradable) can be given as examples.

Examples of the biodegradable synthetic polymer include biodegradable resins, for example, polylactic acid having a chemical structure and functional group which permits assimilation by microorganisms and recognition of a substrate by an enzyme.

A polyhydroxycarboxylic acid available by the polymerization of a hydroxycarboxylic acid such as lactic acid has already been prepared as a biodegradable resin in accordance with the following processes.

1) After synthesis of an oligomer of a hydroxycarboxylic acid, the resulting oligomer is depolymerized into a lactide. The lactide is purified by distillation, followed by open-ring polymerization.

2) After synthesis of a lactic acid oligomer, intramolecular crosslinking is carried out using a compound having a functional group such as isocyanate.

3) After dehydration of a hydroxycarboxylic acid, dehydrating condensation reaction using molecular sieves is carried out in the reaction mixture containing an organic solvent such as anisole or diphenyl ether.

The above-described conventional processes for producing a polylactic acid resin are each accompanied with such problems that since the direct addition of a catalyst to a hyderoxycarboxylic acid causes deactivation, a dehydration step is required in advance. Thus, in spite that a high molecular weight polymer is available, the reaction route is long and the reaction is complex so as to necessitate extra production equipment and many steps for the separation and recovery of the organic solvent, to thereby render the production cost high.

In JP-A-9-31182 (the term "JP-A" as used herein means an "unexamined published Japanese patent application"), the present inventors have already disclosed a polyhydroxycarboxylic acid resin which can be prepared easily in one pot by adding as a polymerization catalyst 1,3-substituted-1,1, 3,3-tetraorganodistanoxane to a hydroxycarboxylic acid such as water-containing L-lactic acid and heating and stirring the resulting mixture under a reduced pressure or in an organic solvent.

The above-described polyhydroxycarboxylic acid resin (biodegradable resin) which can easily be synthesized in one pot is however accompanied with such a problem as insufficient moldability or formability. There is accordingly a strong demand for the development of a biodegradable resin having good moldability or formability.

SUMMARY OF THE INVENTION

An object of the present invention is therefore to solve the above-described problems of the conventional biodegradable resin, and to provide an excellent polyhydroxycarboxylic acid biodegradable resin which can be prepared easily, has high polymerization degree and is improved in the physical properties as a resin and moldability or formability.

Another object of the present invention is to provide a process for preparing the polyhydroxycarboxylic acid biodegradable resin.

Other objects and effects of the invention will become apparent from the following description.

With the forgoing view, the present inventors have made various investigations on the polymerization catalyst for a polyhydroxycarboxylic acid. As a result, they have succeeded in solving the above-described problems by the use of a specific polymerization catalyst.

That is, the above-described objectives of the present invention have been achieved by providing the following compositions and processes.

(1) A biodegradable resin composition obtained by a process comprising:
 providing a reaction mixture comprising at least one hydroxycarboxylic acid and, as a polymerization catalyst, a monoorganotin derivative;
 heating and stirring said reaction mixture,
 wherein said heating and stirring step is carried out under a reduced pressure to cause condensation polymerization or carried out in an organic solvent to cause azeotropic dehydrating polymerization.

(2) The biodegradable resin composition according to the above (1), wherein the hydroxycarboxylic acid is an aliphatic carboxylic acid having in its molecule a hydroxyl group and, when it contains an asymmetric carbon atom, is any one of the D-compound, the L-compound or a racemate.

(3) The biodegradable resin composition according to the above (1) or (2), wherein said hydroxycarboxylic acid is selected from lactic acid, glycolic acid and 3-hydroxybutyric acid.

(4) The biodegradable resin composition according to any one of the above (1) to (3), wherein said monoorganotin derivative contains an organic group to be bonded to the tin atom, said organic group being selected from methyl, ethyl, propyl, allyl, butyl, phenyl, benzyl, octyl and naphthyl groups.

(5) The biodegradable resin composition according to any one of the above (1) to (4), wherein the tin atom of said monoorganotin derivative has a substituent selected from halogen atoms, thiocyanato group, hydroxyle group, alkoxy groups and carboxyl group.

(6) The biodegradable resin composition according to any one of the above (1) to (4), wherein said monoorganotin derivative is a monoorganotin oxide.

(7) A process for preparing a biodegradable resin composition, comprising:

providing a reaction mixture comprising at least one hydroxycarboxylic acid and, as a polymerization catalyst, a monoorganotin derivative;

heating and stirring said reaction mixture, wherein said heating and stirring step is carried out under a reduced pressure to cause condensation polymerization or carried out in an organic solvent to cause azeotropic dehydrating polymerization.

(8) The process according to the above (7), wherein the hydroxycarboxylic acid is an aliphatic carboxylic acid having in its molecule a hydroxyl group and, when it contains an asymmetric carbon atom, is any one of the D-compound, the L-compound or a racemate.

(9) The process according to the above (7) or (8), wherein said hydroxycarboxylic acid is selected from lactic acid, glycolic acid and 3-hydroxybutyric acid.

(10) The process according to any one of the above (7) to (9), wherein said monoorganotin derivative contains an organic group to be bonded to the tin atom, said organic group being selected from methyl, ethyl, propyl, allyl, butyl, phenyl, benzyl, octyl and naphthyl groups.

(11) The process according to the above (7) to (10), wherein the tin atom of said monoorganotin derivative has a substituent selected from halogen atoms, thiocyanato group, hydroxyl group, alkoxy groups and carboxyl group.

(12) The process according to the above (7) to (10), wherein said monoorganotin derivative is a monoorganotin oxide.

DETAILED DESCRIPTION OF THE INVENTION

The present invention is described in detail below.

The biodegradable resin composition according to the present invention is prepared from a mixture comprising at least one hydroxycarboxylic acid and, as a polymerization catalyst, a monoorganotin derivative. More specifically, the composition can be obtained through condensation polymerization caused by heating and stirring the mixture under a reduced pressure or through azeotropic dehydrating polymerization caused by heating and stirring the mixture in an organic solvent.

The monoorganotin derivative used as a polymerization catalyst is preferably represented by the following formula (I):

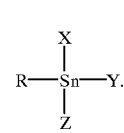

(1)

In the above formula, R represents a linear or cyclic $C_{1-12}$ organic group and preferred examples thereof include methyl, ethyl, propyl, allyl, butyl, phenyl, benzyl, octyl and naphthyl groups.

X, Y and Z may be the same or different and each independently represents a halogen or a thiocyanato, hydroxyl, alkoxy or carboxyl group. Examples of the alkoxy group include $C_{1-6}$ groups such as methoxy, ethoxy, propoxy, butoxy and phenoxy. Examples of the carboxyl group include acetoxy, lactoxy, benzoxy, octoxy and lauroxy groups.

Compared with a 1,3-substituted-1,1,3,3-tetraorganodistanoxane which is a direct polymerization catalyst for a hydroxycarboxylic acid as disclosed in the above-described JP-A-9-1182, the monoorganotin derivative for use as a polymerization catalyst in the present invention has following features:

a) A high molecular weight polyhydroxycarhoxylic acid can be obtained.

b) Compared with a diorganotin compound such as distanoxane, the monoorganotin derivative has lower toxicity so that even if it is disposed after use without recovery, its influence on the environment after degradation is not so serious.

The organic group R of the monoorganotin derivative is not particularly limited but, from the viewpoint of synthesis easiness, preferred are methyl, ethyl, propyl, allyl, butyl, phenyl, benzyl, octyl and naphthyl groups.

The substituents X, Y and Z of the monoorganotin derivative are not particularly limited but, from the viewpoint of synthesis easiness, preferred are halogens such as chlorine, bromine and fluorine, carboxylates such as acetate, octoate and laurate and alkoxy groups such as methoxy, ethoxy and phenoxy. Similar to monoorganotin oxide, some tin atoms may form an oligomer via oxygen atoms interposed therebetween.

Specific examples of the monoorganotin derivative represented by the formula (I) are exemplified below, but the present invention is not limited thereto.

Examples of monoorganotin oxides include monomethyltin oxide, monoethiyltin oxide, monopropyltin oxide, monobutyltin oxide, monophenyltin oxide, monobenzyltin oxide, monooctyltin oxide and mononaphthyltin oxide.

Examples of monoorganotin bromides include monomethlytin tribromide, monoethyltin tribromide, mongopropyltin tribromide, mnonobutyltin tribromide, monophenyltin tribromide, monobenzyltin tribromide, monooctyltin tribromide and mononaphthyltin tribromide.

Examples of monoorganotin chlorides include monomeehyltin trichioride, monoethyltin trichloride, monopropyltin trichloride, monobueyltin trichloride, monophenyltin trichioride, monobenzyltin trichloride, monooctyltin trichboride and mononaphthyltin trichloride.

Examples of monoorganotin fluorides include monomethyltin trifluoride, monoethyltin trifluoride, monopropyltin trifluoride, monobutyltin trifluoride, monophenyltin trifluoride, monobenzyltin trifluoride, monooctyltin trifluoride and mononaphthyltin trifluoride.

Examples of monoorganotin alkoxy compounds include monomethyltin trialkoxide, monoethyltin trialkoxide, monopropyltin trialkoxide, monobutyltin trialkoxide, monophenyltin trialkoxide, monobenzyltin trialkoxide, monooctyltin trialkoxide and mononaphthyltin trialkoxide (the term "alkoxy" as used herein means to include methoxy, ethoxy, propoxy, butoxy, phenoxy and the like).

Examples of monoorganotin carboxy compounds include monomethyltin tricarboxide, monoethyltin tricarboxide, monopropyltin tricarboxide, monobutyltin tricarboxide, monophenyltin tricarboxide, monobenzyltin tricarboxide, monooctyltin tricarboxide and mononaphthyltin tricarboxide (the term "carboxy group" as used herein means to include acetoxy, lactoxy, buenoxy, octoxy, lauroxy and the like).

The monoorganotin derivative to be used as a polymerization catalyst is preferably added in an amount of mrope 0.00001 to 2 parts by weight based on 100 parts by weight of the hydroxycarboxylic acid. When the amount is smaller than 0.0001 part by weight, marked catalyst activity cannot be attained. When the amount exceeds 2 part by weight, on the other hand, the weight average molecular weight of the resin lowers. Amounts outside the above range are therefore not preferred.

The hydroxycarboxylic acid for use in the polymerization of the present invention is preferably an aliphatic carboxylic acid having in its molecule a hydroxyl group. When it has an asymmetric carbon, it may be any one of the D-compound, the L-compound and a racemate. Alternatively, at least two hydroxycarboxylic acids may be used in combination.

Specific examples of the hydroxycarboxylic acid include lactic acid, glycolic acid, 3-hydroxybutyric acid, 4-hydroxybutyric acid, 3-hydroxyvaleric acid, 5-hydroxyvaleric acid, 6-hydroxycaproic acid, citric acid, malic acid and tartaric acid, but the present invention is not limited thereto. From the viewpoint of availability, it is preferred to use lactic acid, glycolic acid, tartaric acid, citric acid and malic acid either singly or in combination.

Upon polymerization, a saccharide or metal oxide may be added as needed.

Preferred examples of the saccharide include starches, sucrose and D-glucose.

The saccharide is preferably added in an amount of from 10 to 0.001 part by weight based on 100 parts by weight of the hydroxycarboxylic acid.

Preferred examples of the metal oxide include aluminum hydroxide, zinc hydroxide, magnesium hydroxide, calcium hydroxide and phosphoric acid.

The metal oxide is preferably added in an amount of from 10 to 0.0001 part by weight based on 100 parts by weight of the hydroxycarboxylic acid.

The biodegradable resin composition of the present invention can be obtained by charging appropriately selected hydroxycarboxylic acid and monoorganotin derivative, adding the third substance such as polysaccharide or metal oxide as needed, and then reacting the resulting mixture at a temperature ranging from 160 to 200° C. for 2 to 48 hours under a reduced pressure.

In the polymerization of a hydroxycarboxylic acid in a solution according to the present invention, on the other hand, any organic solvent can be used as long as it has a boiling point higher than water and is not compatible with water. Preferred is D-limonene which is a natural product and has not so bad influence on both the environment and human body even if it has remained in the resin. The biodegradable resin composition of the present invention can be obtained by azeotropic dehydrating polymerization of the above-described mixture by stirring and refluxing it under heat in an organic solvent for 2 to 48 hours.

The present invention will be described in greater detail with reference to the following Examples, but the invention should not be construed as being limited thereto.

For solvent-free polymerization, a 500-ml separable flask and a 60-cm air condenser were used as reactors, while for polymerization in a solution, a 200-ml eggplant-type flask, T tube, 20-ml eggplant type flask for water intake and air condenser were used.

EXAMPLE 1

In a 500-ml reactor (which will hereinafter be called "reactor" simply), 100 g (1 mol) of 90% L-lactic acid and, as a catalyst, 50 mg of monobutyltin oxide were charged, followed by stirring under heat at 190° C. for 22 hours under a reduced pressure, to thereby obtain a polylactic acid biodegradable resin A. The resulting polylactic acid biodegradable resin A was found to have a weight-average molecular weight of 87,000.

The molecular weight was measured using gel permeation chromatography (GPC). GPC was carried out using a high-pressure pump ("510 type" for high performance liquid chromatography; manufactured by Nippon Millgipore Ltd.), a differential refractometer ("Shodex RI-71", manufactured by Showa Dengo K.K.) and "Column GPCK806M" were employed. The weight-average molecular weight is a value as measured in terms of standard polystyrene conversion.

EXAMPLE 2

In a 200-ml eggplant type flask, 100 g (1 mol) of 90% L-lactic acid and, as a catalyst, 50 mg of monobutyltin oxide were charged. After the addition of 200 ml of D-limonene, a T tube, a 20-ml eggplant type flask for water intake and air condenser were attached. While allowing water to flow out of the system, the resulting mixture was polymerized by refluxing and stirring under heat for 22 hours, thereby a polylactic acid biodegradable resin A' was obtained.

The resulting polylactic acid biodegradable resin A' was found to have a weight average molecular weight of 45,000.

EXAMPLE 3

In a reactor, 100 g (1 mol) of 90% L-lactic acid and, as a catalyst, 50 mg of monophenyltin oxide were charged. The resulting mixture was stirred under heat at 190° C. for 22 hours under a reduced pressure, thereby a polylactic acid biodegradable resin B was obtained.

The resulting polylactic acid biodegradable resin B was found to have a weight average molecular weight of 51,000.

EXAMPLE 4

In a reactor, 100 g (1 mol) of 90% L-lactic acid and, as a catalyst, 50 mg of monomethyltin trichloride were charged. The resulting mixture was stirred under heat at 190° C. for 22 hours under a reduced pressure, thereby a polylactic acid biodegradable resin C was obtained.

The resulting polylactic acid biodegradable resin C was found to have a weight average molecular weight of 69,000.

EXAMPLE 5

In a reactor, 100 g (1 mol) of 90% L-lactic acid and, as a catalyst, 50 mg of monooctyltin trichloride were charged.

The resulting mixture was stirred under heat at 190° C. for 22 hours under a reduced pressure, thereby a polylactic acid biodegradable resin D was obtained.

The resulting polylactic acid biodegradable resin D was found to have a weight average molecular weight of 47,000.

EXAMPLE 6

In a reactor, 100 g (1 mol) of 90% L-lactic acid and, as a catalyst, 50 mg of monobutyltin tribenzoate were charged. The resulting mixture was stirred under heat at 190° C. for 22 hours under a reduced pressure, thereby a polylactic acid biodegradable resin E was obtained.

The resulting polylactic acid biodegradable resin E was found to have a weight average molecular weight of 75,000.

EXAMPLE 7

In a 500-ml eggplant type flask, 100 g (1 mol) of 90% L-lactic acid and, as a catalyst, 50 mg of monobutyltin tribenzoate were charged. After the addition of 200 ml of D-limonene, a T tube, a 20-ml eggplant type flask for water intake and air condenser were attached. While allowing water to flow out of the system, the resulting mixture was polymerized by refluxing and stirring under heat for 22 hours, thereby a polylactic acid biodegradable resin E' was obtained.

The resulting polylactic acid biodegradable resin E' was found to have a weight average molecular weight of 45,000.

Comparative Example 1

In a reactor, 100 g (1 mol) of 90% L-lactic acid and, as a catalyst, 50 mg (0.1 mol) of 1,3-dichlorotetrabutyldistanoxane were charged, followed by stirring under heat at 190° C. for 22 hours under a reduced pressure, thereby a polylactic acid biodegradable resin F corresponding to the resin of Example 1 in the above-described JP-A-9-31182.

The resulting polylactic biodegradable resin F was found to have a weight average molecular weight of 30,000.

Test:

It is considered that polylactic acid is degraded and assimilated by microorganisms after its molecular weight is lowered by hydrolysis, and is finally degraded into a carbon dioxide gas and water. A hydrolysis test was therefore carried out as an index of biodegradability. The polylactic acids obtained in the above examples were each molded into a No. 1 dumbbell specimen as specified in JIS K 7113 by an injection molding machine. The specimen was then soaked in 100 ml of 0.1 N-NaOH at 30° C. for 7 days and weight loss was studied. The weight loss relative to the original weight set at 100 is shown in Table 1.

TABLE 1

| | | Molecular weight Mw·$10^{-4}$ | Weight loss (%) | |
|---|---|---|---|---|
| | Resin | | Soaking for 3 days | Soaking for 7 days |
| Ex. 1 | A | 8.7 | 99.6 | 97.6 |
| Ex. 2 | A' | 4.5 | 99.3 | 97.7 |
| Ex. 3 | B | 5.1 | 99.3 | 97.6 |
| Ex. 4 | C | 6.9 | 99.7 | 97.6 |
| Ex. 5 | D | 4.7 | 99.4 | 97.0 |
| Ex. 6 | E | 7.5 | 99.0 | 96.4 |
| Ex. 7 | E' | 4.5 | 99.3 | 96.9 |
| Comp. Ex. 1 | F | 3.0 | 99.4 | 97.6 |

From the results in Table 1, it can be seen that the remaining weight of the biodegradable resin composition according to the present invention is almost similar to that of the conventional polyhydroxycarboxylic acid resin in comparative example so that the biodegradable resin composition according to the present invention has sufficient hydrolytic property.

It is considered that a polyhydroxycarboxylic acid such as polylactic acid is degraded and assimilated by microorganisms after its molecular weight is lowered by hydrolysis, and is finally degraded into a carbon dioxide gas and water.

The above hydrolysis results therefore suggest that the biodegradable resin composition according to the resent invention has equivalent hydrolytic property and biodegradability to the conventional polylactic homopolymer.

Compared with a polyhydroxycarboxylic acid resin synthesized by the conventional direct polymerization process, the biodegradable resin composition according to the present invention has an increased molecular weight, thereby having improved moldability or formability.

By making use of processed products or molded or formed products of the biodegradable resin composition of the present invention in our daily life instead of the conventional plastic products having difficulty in waste disposal, environmental inhibition caused by the disposal of used plastic products can be relaxed largely and such a resin contributes much to the environmental protection.

The biodegradable resin composition of the present invention is most suited for the use as a material necessary for agriculture or fishery, because recovery of the material costs a great deal.

While the invention has been described in detail with reference to specific examples thereof, it will be apparent to one skilled in the art that various changes and modifications can be made therein without departing from the spirit and scope thereof.

What is claimed is:

1. A biodegradable resin composition obtained by a process comprising:

providing a reaction mixture comprising at least one hydroxycarboxylic acid and, as a polymerization catalyst, a monoorganotin derivative; and heating and stirring said reaction mixture, wherein said heating and stirring step is carried out under a reduced pressure to cause condensation polymerization or carried out in an organic solvent to cause azeotropic dehydrating polymerization, and wherein the monoorganotin derivative is represented by formula (I):

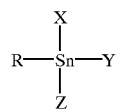
(1)

wherein R represents a linear or cyclic $C_{1-12}$ organic group and X, Y and Z may be the same or different and each independently represents a halogen or a thiocyanato, hydroxyl, alkoxy or carboxyl group.

2. The biodegradable resin composition according to claim 1, wherein the hydroxycarboxylic acid is an aliphatic carboxylic acid having in its molecule a hydroxyl group and, when it contains an asymmetric carbon atom, is any one of the D-compound, the L-compound or a racemate.

3. The biodegradable resin composition according to claim 1, wherein said hydroxycarboxylic acid is selected from the group consisting of lactic acid, glycolic acid and 3-hydroxybutyric acid.

4. The biodegradable resin composition according to claim 1, wherein said monoorganotin derivative contains an organic group to be bonded to the tin atom, said organic group being selected from methyl, ethyl, propyl, allyl, butyl, phenyl, benzyl, octyl and naphthyl groups.

5. The biodegradable resin composition according to claim 1, wherein the tin atom of said monoorganotin derivative has a substituent selected from the group consisting of halogen atoms, thiocyanato group, hydroxyl group, alkoxy groups and carboxyl group.

6. The biodegradable resin composition according to claim 1, wherein said monoorganotin derivative is a monoorganotin oxide.

7. A process for preparing a biodegradable resin composition, comprising:
providing a reaction mixture comprising at least one hydroxycarboxylic acid and, as a polymerization catalyst, a monoorganotin derivative; and
heating and stirring said reaction mixture,
wherein said heating and stirring step is carried out under a reduced pressure to cause condensation polymerization or carried out in an organic solvent to cause azeotropic dehydrating polymerization, and wherein the monoorganotin derivative is represented by formula (I):

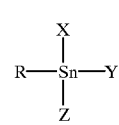
(1)

wherein R represents a linear or cyclic $C_{1-12}$ organic group and X, Y and Z may be the same or different and each independently represents a halogen or a thiocyanato, hydroxyl, alkoxy or carboxyl group.

8. The process according to claim 7, wherein the hydroxycarboxylic acid is an aliphatic carboxylic acid having in its molecule a hydroxyl group and, when it contains an asymmetric carbon atom, is any one of the D-compound, the L-compound or a racemate.

9. The process according to claim 7, wherein said hydroxycarboxylic acid is selected from the group consisting of lactic acid, glycolic acid and 3-hydroxybutyric acid.

10. The process according to claim 7, wherein said monoorganotin derivative contains an organic group to be bonded to the tin atom, said organic group being selected from methyl, ethyl, propyl, allyl, butyl, phenyl, benzyl, octyl and naphthyl groups.

11. The process according to claim 7, wherein the tin atom of said monoorganotin derivative has a substituent selected from halogen atoms, thiocyanato group, hydroxyl group, alkoxy groups and carboxyl group.

12. The process according to claim 7, wherein said monoorganotin derivative is a monoorganotin oxide.

* * * * *